(12) United States Patent
Klieves

(10) Patent No.: US 12,523,451 B2
(45) Date of Patent: Jan. 13, 2026

(54) VEHICLE CELL AND PROTECTED VEHICLE

(71) Applicant: Rheinmetall Landsysteme GmbH, Südheide (DE)

(72) Inventor: Thorben Klieves, Trendelburg (DE)

(73) Assignee: Rheinmetall Landsysteme GmbH, Unterlüß (DE)

(*) Notice: Subject to any disclaimer, the term of this patent is extended or adjusted under 35 U.S.C. 154(b) by 0 days.

(21) Appl. No.: 18/837,337

(22) PCT Filed: Nov. 17, 2022

(86) PCT No.: PCT/EP2022/082318
§ 371 (c)(1),
(2) Date: Aug. 9, 2024

(87) PCT Pub. No.: WO2023/151840
PCT Pub. Date: Aug. 17, 2023

(65) Prior Publication Data
US 2025/0146797 A1   May 8, 2025

(30) Foreign Application Priority Data
Feb. 14, 2022   (DE) .................. 102022103396.1

(51) Int. Cl.
*F41H 7/04* (2006.01)

(52) U.S. Cl.
CPC ............. *F41H 7/042* (2013.01); *F41H 7/044* (2013.01)

(58) Field of Classification Search
CPC ..... F41H 5/04; F41H 5/14; F41H 5/16; F41H 5/24; F41H 7/042; F41H 7/044; F16B 5/00; F16B 7/04; F16B 21/00; B60R 21/13; B60R 21/26; E04H 9/14
USPC ...... 89/36.08, 36.14, 36.15, 36.07; 52/309.9, 52/310.1; 403/322, 323, 324
See application file for complete search history.

(56) References Cited

U.S. PATENT DOCUMENTS

| 5,340,189 A * | 8/1994 | Goodman | F41H 5/08 89/36.01 |
| 5,533,778 A * | 7/1996 | Sheridan | F41H 5/226 89/36.07 |
| 7,114,760 B2 * | 10/2006 | Cameron | B60J 1/20 89/36.01 |

(Continued)

FOREIGN PATENT DOCUMENTS

| DE | 39 18 079 C2 | 4/1996 |
| DE | 102 59 918 A1 | 7/2004 |

(Continued)

*Primary Examiner* — Michael D David
(74) *Attorney, Agent, or Firm* — Young Basile Hanlon & MacFarlane, P.C.

(57) ABSTRACT

A vehicle cell for a protected vehicle includes an assembly having a structural component, an additional component arranged within the vehicle cell, and a connection and decoupling apparatus that connects the additional component to the structural component. The connection and decoupling apparatus is configured to mechanically decouple the additional component from the structural component in the event of a deformation of the structural component resulting from a blast acting on the structural component. In one example the connection and decoupling apparatus is a hook and loop fastener.

17 Claims, 6 Drawing Sheets

(56) References Cited

U.S. PATENT DOCUMENTS

| | | | | |
|---|---|---|---|---|
| 7,533,600 B2 * | 5/2009 | Marqueling | ............... | F41H 5/16 89/36.09 |
| 7,841,269 B1 * | 11/2010 | Jacobs | .................... | F41H 5/013 89/36.01 |
| 8,746,122 B1 * | 6/2014 | Roland | .................... | F41H 5/023 89/36.02 |
| 8,943,946 B1 * | 2/2015 | Richmond | ............. | B62D 21/15 89/36.02 |
| 9,170,072 B1 * | 10/2015 | Riggs | ..................... | F41H 5/013 |
| 9,651,340 B1 * | 5/2017 | Tunis, III | .................. | E06B 9/00 |
| 10,281,243 B2 * | 5/2019 | Macias | .................... | F41H 5/08 |
| 10,352,660 B2 * | 7/2019 | Trott | ........................ | F41H 5/26 |
| D887,926 S * | 6/2020 | Martin | .................... | F41H 5/263 D12/182 |
| 11,798,443 B1 * | 10/2023 | Janik | ..................... | G09F 27/004 |
| 12,130,122 B1 * | 10/2024 | Smith | ................. | H01M 50/209 |
| 2005/0257679 A1 * | 11/2005 | Hass | ........................ | F41H 7/02 89/36.09 |
| 2005/0284682 A1 * | 12/2005 | Hass | ........................ | F41H 7/042 180/242 |
| 2007/0084337 A1 * | 4/2007 | Strassgurtl | ............... | F41H 7/042 296/193.07 |
| 2008/0190278 A1 * | 8/2008 | Martin | ........................ | F41H 7/04 89/36.01 |
| 2010/0297388 A1 * | 11/2010 | Dagher | .................... | F42D 5/045 977/773 |
| 2012/0174758 A1 * | 7/2012 | Chu | ............................ | F41H 7/04 89/36.01 |
| 2013/0205981 A1 * | 8/2013 | Bayer | ...................... | F41H 5/013 89/36.02 |
| 2013/0205983 A1 * | 8/2013 | Martin | .................... | F41H 5/263 89/36.07 |
| 2014/0116235 A1 * | 5/2014 | Berroth | ................. | F41H 5/0492 89/36.01 |
| 2015/0345912 A1 * | 12/2015 | Svane | ..................... | F41H 5/007 89/36.17 |
| 2019/0310055 A1 * | 10/2019 | Evans | ...................... | F41H 7/042 |
| 2020/0023916 A1 * | 1/2020 | Mackarvich | ............ | F41H 7/044 |
| 2022/0404124 A1 * | 12/2022 | Collombet | .......... | B64D 11/0619 |
| 2023/0375311 A1 * | 11/2023 | Sloman | ................... | F41H 7/042 |
| 2025/0146797 A1 * | 5/2025 | Klieves | ................... | F41H 7/042 |

FOREIGN PATENT DOCUMENTS

| | | |
|---|---|---|
| DE | 20 2004 012 929 U1 | 12/2005 |
| DE | 10 2013 008 441 A1 | 3/2014 |
| WO | 2006/108613 A1 | 10/2006 |
| WO | 2009/007972 A2 | 1/2009 |
| WO | 2012/033513 A1 | 3/2012 |
| WO | 2012/167245 A1 | 12/2012 |

* cited by examiner

VEHICLE CELL AND PROTECTED VEHICLE

CROSS-REFERENCE TO RELATED APPLICATION(S)

This application is filed pursuant to 35 U.S.C. § 371 claiming priority benefit to PCT/EP2022/082318 filed Nov. 17, 2022, which claims priority benefit to German Patent Application 102022103396.1 filed Feb. 14, 2022, the contents of both applications are incorporated herein by reference in the entirety for all purposes.

TECHNICAL FIELD

The present invention relates to a vehicle cell for a protected vehicle and to a protected vehicle with such a vehicle cell.

BACKGROUND

A protected vehicle includes a vehicle cell that is protected against ballistics. When designing such a protected vehicle, it may be necessary to install additional components, such as bulkheads, partitions, shelving structures or the like, inside the vehicle cell and attach them to it. Such additional components usually comprise a high degree of rigidity. Due to their rigidity, these additional components can react by buckling when large forces are introduced, which can, for example, cause pieces of equipment stored in or on the respective additional component to be greatly accelerated. This in turn can cause these pieces of equipment to be accelerated to such an extent that they act like projectiles within the vehicle cell. It must therefore be ensured that no energy and thus no accelerations are introduced into the additional components when the protected vehicle is blasted.

According to in-house findings, such additional components can be suspended decoupled from a bottom of the vehicle cell. Additional components in the form of bulkheads or partitions can be bent. It is also possible to divide them and weld them overlapping so that buckling or deformation occurs within a controllable range. However, the measures mentioned above can supply a comparatively complex and heavy construction. In addition, the aforementioned solutions do not offer any conclusive certainty that the connection of the additional components to the vehicle cell will not result in energy being introduced into the additional components. Curved bulkheads or partition walls also require more installation space, which can also make it more difficult to construct adjacent components in the immediate vicinity. This needs to be improved.

SUMMARY

Against this background, one task of the present invention is to provide an improved vehicle cell for a protected vehicle.

Accordingly, a vehicle cell for a protected vehicle is proposed. The vehicle cell comprises an assembly comprising a structural component, an additional component arranged within the vehicle cell, and a connection and decoupling apparatus, with the aid of which the additional component is connected to the structural component, wherein the connection and decoupling apparatus is configured to mechanically decouple the additional component from the structural component in the event of deformation of the structural component resulting from a blast acting on the structural component, and wherein the connection and decoupling apparatus is a hook and loop fastener.

The fact that the connection and decoupling apparatus is suitable for mechanically decoupling the additional component from the structural component during blasting can reliably prevent forces and accelerations resulting from the blasting from being transferred from the deformed structural component to the additional component. This means that pieces of equipment mounted on or in the additional component cannot act as projectiles.

The assembly can also be referred to as a protective assembly. Accordingly, the terms "assembly" and "protective assembly" can be used interchangeably. In the present case, a "protected" vehicle means a vehicle that is protected against shelling, booby traps, improvised explosive devices (IEDs), mines, any explosive charge or the like. The vehicle can be armored for this purpose.

The assembly can comprise several structural components. The number of structural components is basically arbitrary. In the following, however, reference is made to only one structural component. The structural component may also be referred to as a structural part. The structural component can be part of the vehicle cell of the vehicle. The assembly can thus be part of the vehicle cell. Furthermore, the vehicle cell itself may function as a structural component. In other words, the vehicle cell itself may be the structural component.

The vehicle cell preferably encloses an interior in which crew members, or a vehicle crew can stay. The additional component is placed within this interior or within the vehicle cell. However, this is not absolutely necessary. The additional component can also be provided on the outer side of the vehicle cell.

For example, the structural component is a wall of the aforementioned vehicle cell. Accordingly, the term "structural component" can be replaced by the term "wall" and vice versa. The vehicle cell preferably comprises two structural components arranged parallel to each other and at a distance from each other in the form of side walls, in particular a first side wall and a second side wall, a structural component designed as a bottom and a structural component designed as a ceiling or roof. In the present case, a "structural component" is to be understood in particular as a load-bearing component of the protected vehicle.

The structural component can be made of a metallic material. For example, the structural component may be or comprise a steel plate or an aluminum plate. However, the structural component may also comprise composite materials. The structural component can be transferred from an undeformed state to a deformed state using an explosive charge that generates a blast. The deformation is elastic and/or plastic. This means that the deformation can at least partially recover.

The additional component can be a shelf structure, a bulkhead, a partition, armoring or the like. The additional component can also be a moving floor that can be placed inside the vehicle cell. The additional component may also be referred to as an additional part. In particular, the additional component may be configured to accommodate pieces of equipment. In this case, the additional component is preferably a shelf or a shelf structure.

The connection and decoupling apparatus connects the additional component to the structural component. The additional component thus rests on the structural component. In other words, the structural component supports the additional component. The connection between the additional component and the structural component can be direct or indirect. In this context, "direct" means, in particular, that the connection and decoupling apparatus connects the additional component directly to the structural component. This means that no other parts or components are provided between the additional component and the connection and decoupling apparatus or between the connection and decoupling apparatus and the structural component.

In contrast to this, "indirectly" means in particular that the connection and decoupling apparatus connects the additional component indirectly to the structural component. In this case, in contrast to the direct connection between the additional component and the connection and decoupling apparatus or between the connection and decoupling apparatus and the structural component, further parts or components may be provided. These further parts or components may, for example, be carrier elements to be explained later. These further parts or components can each be part of the additional component or part of the structural component.

The connection between the additional component and the structural component can be materially bonded, positive and/or force-fit. In the case of materially bonded connections, the connecting partners are held together by atomic or molecular forces. Materially bonded connections are nondetachable connections that can only be separated by destroying the connecting means and/or the connecting partners. In this case, the connection and decoupling apparatus can be an adhesive bond or an adhesive joint, for example.

A positive connection is created by at least two connecting partners engaging in or behind each other. In particular, a positive connection can be released and restored as often as required. The connection and decoupling apparatus is a hook and loop fastener or a hook and loop connection. Accordingly, the connection and decoupling apparatus can be referred to as a hook and loop fastener or hook an loop connection.

A "hook and loop fastener" or a "hook and loop connection" is to be understood here as a fastening means that can be released as often as required and is based on the principle of hook and loop fasteners. The bionic implementation of such a hook and loop fastener or hook and loop fastener connection can take the form of two band-shaped or strip-shaped components or elements, one of which comprises flexible hooks, hook sections or barbs and the other component comprises flexible loops or loop sections. When pressed together, the two components form a load bearing but reversible quick-release fastener.

In the event that the connection and decoupling apparatus is a hook and loop fastener or a hook and loop connection, a further development of the assembly for the protected vehicle is proposed. In this case, the assembly comprises a structural component, an additional component and a hook and loop connection, with the aid of which the additional component is connected to the structural component, wherein the hook and loop connection is configured to mechanically decouple the additional component from the structural component in the event of a deformation of the structural component resulting from a blast acting on the structural component. In particular, the hook and loop connection is opened or released when the structural component is blasted or when the structural component is deformed.

A force-fit connection, on the other hand, requires a normal force on the surfaces to be connected. Force-fit connections can be realized by friction locking. A mutual displacement of the surfaces to be connected is prevented as long as a counterforce caused by the static friction is not exceeded. A force-fit connection can be realized, for example, as a magnetic force-fit connection. In this case, the connection and decoupling apparatus comprises magnetic properties, at least in sections.

By the fact that the connection and decoupling apparatus is configured to "mechanically decouple" the additional component from the structural component, it is to be understood here that the connection and decoupling apparatus automatically or autonomously releases the connection between the additional component and the structural component when the structural component is stressed as a result of the deformation of the structural component, so that accelerations and/or forces resulting from the deformation of the structural component cannot be transmitted to the additional component or can only be transmitted to it to a reduced extent.

The connection and decoupling apparatus thus acts as a separation point or predetermined breaking point between the structural component and the additional component. Accordingly, the terms "connection and decoupling apparatus" and "predetermined breaking point" can be used interchangeably. The mechanical decoupling of the additional component from the structural component is achieved in particular by automatically releasing the materially bonded, positive and/or force-fit connection produced by the connection and decoupling apparatus when the structural component is blasted.

In this case, "automatic" or "autonomous" means in particular that the connection and decoupling apparatus is not controlled with the aid of an external controller or the like, but rather that the connection and decoupling apparatus reacts autonomously to the deformation of the structural component when the structural component is deformed and separates the additional component from the structural component or mechanically decouples it from the structural component.

According to one embodiment, the additional component of the connection and decoupling apparatus is positively connected to the structural component.

As previously mentioned, a positive connection can be released and re-established as often as required. In particular, this means that the additional component can be reconnected to the structural component after the structural component has been blasted. Both releasing and connecting can be carried out without or without tools. A positive connection is thus established between the additional component and the structural component with the aid of the connection and decoupling apparatus. However, as mentioned above, the connection between the additional component and the structural component can also be a materially bonded and/or force-fit connection. Any combination of a materially bonded, positive and/or force-fit connection can also be provided.

According to another embodiment, the connection and decoupling apparatus comprises a first connection and decoupling element assigned to the structural component and a second connection and decoupling element assigned to the additional component, wherein the first connection and decoupling element and the second connection and decoupling element engage positively with one another to connect the additional component to the structural component.

The first connection and decoupling element and the second connection and decoupling element together form the connection and decoupling apparatus. In the event that the connection and decoupling apparatus establishes a materially bonded connection between the structural component and the additional component, the first connection and decoupling element and the second connection and decoupling element can be part of an adhesive bond that forms the connection and decoupling apparatus. Alternatively, at least one of the two connection and decoupling elements can be a magnet, in particular a permanent magnet. The first connection and decoupling element may also be referred to as the first connecting and separating element. Accordingly, the second connection and decoupling element can also be referred to as the second connection and separating element.

According to another embodiment, the positive connection between the first connection and decoupling element and the second connection and decoupling element is automatically released as a result of the deformation of the structural component in order to mechanically decouple the additional component from the structural component.

In particular, the structural component moves towards the additional component when it is deformed. This relative movement releases the connection between the first connection and decoupling element and the second connection and decoupling element, so that the additional component is mechanically decoupled from the structural component. The releasing of the connection between the two connection and decoupling elements is, as previously mentioned, automatic or autonomous, so that no external control of the connection and decoupling apparatus is required. The connection between the first connection and decoupling element and the second connection and decoupling element can be released in such a way that there is no longer any contact between the first connection and decoupling element and the second connection and decoupling element. However, this is not absolutely necessary. The connection between the first connection and decoupling element and the second connection and decoupling element can also be released in such a way that there is still contact between the first connection and decoupling element and the second connection and decoupling element.

According to another embodiment, when the structural component is deformed, oppositely and parallel oriented shearing forces act on the first connection and decoupling element and on the second connection and decoupling element in order to release the positive connection between the first connection and decoupling element and the second connection and decoupling element.

In other words, the connection and decoupling apparatus or the connection and decoupling elements are subjected purely or exclusively to shearing forces. The shearing forces shear the connection between the first connection and decoupling element and the second connection and decoupling element, causing them to release from each other in order to mechanically decouple the additional component from the structural component.

According to another embodiment, the first connection and decoupling element is oriented perpendicular to the structural component, wherein the second connection and decoupling element is oriented perpendicular to the additional component.

However, the first connection and decoupling element can also be oriented at an angle to the structural component. Accordingly, the second connection and decoupling element can also be oriented at an angle to the additional component. The assembly is preferably assigned a coordinate system with a width direction or x-direction, a height direction or y-direction and a depth direction or z-direction. The directions are oriented perpendicular to each other. Preferably, the first connection and decoupling element and the second connection and decoupling element run along the y-direction. Accordingly, the structural component and the additional component can each run along the z-direction. The structural component and the additional component can thus be positioned parallel to each other and at a distance from each other. In the present case, "perpendicular" means in particular an angle of 90°±10°, preferably of 90°±5°, more preferably of 90°±3°, more preferably of 90°±1°, more preferably of exactly 90°.

According to another embodiment, the first connection and decoupling element comprises engagement sections, wherein the second connection and decoupling element comprises counter engagement sections corresponding to the engagement sections, and wherein the engagement sections are configured to engage positively in the counter engagement sections.

The first connection and decoupling element can comprise any number of engagement sections. In particular, a basic section is associated with the first connection and decoupling element, from which any number of engagement sections extend out on a front side thereof. The engagement sections can be arranged in a grid or pattern. "Grid-shaped" or "pattern-shaped" means that the engagement sections can be arranged in rows and columns. The rear side of the basic section can, for example, be connected to the structural component, in particular glued to it. Accordingly, the second connection and decoupling element also comprises such a basic section, from the front side of which any number of counter engagement sections extend. The number of counter engagement sections is arbitrary. The number of engagement sections and the number of counter engagement sections need not be identical. The counter engagement sections are arranged in a pattern or grid on the basic section of the second connection and decoupling element. On a rear side facing away from the counter engagement sections, the second connection and decoupling element can be connected, in particular bonded, to the additional component.

According to another embodiment, the engagement sections and/or the counter engagement sections are elastically deformable.

In particular, the engagement sections and/or the counter engagement sections are elastically deformable. In particular, this means that the engagement sections and/or the counter engagement sections can be brought from an undeformed state into a deformed state by applying a force. As soon as this force is no longer applied, the engagement sections and/or the counter engagement sections automatically return from the deformed state to the undeformed state. Either only the engagement sections, only the counter engagement sections or both the engagement sections and the counter engagement sections are elastically deformable.

According to another embodiment, the engagement sections are hook-shaped and the counter engagement sections are loop-shaped or vice versa.

"Or vice versa" in this case means in particular that the engagement sections can be loop-shaped, and the counter engagement sections can be hook-shaped. However, the geometries of the engagement sections and the counter engagement sections are basically arbitrary. In particular, the engagement sections and the counter engagement sections merely have the property of being able to positively engage with one another in order to connect the first connection and decoupling element and the second connection and decoupling element to one another. The engagement sections can also be referred to as hook sections or barb sections. Accordingly, the counter engagement sections may be referred to as loop sections.

According to another embodiment, the assembly further comprises a first carrier element, which is connected to the structural component and carries the first connection and decoupling element, and a second carrier element, which is connected to the additional component and carries the second connection and decoupling element.

For example, the first connection and decoupling element is bonded, riveted and/or screwed to the first carrier element. Accordingly, the second connection and decoupling element can also be bonded, riveted and/or screwed to the second carrier element. For example, the first carrier element is welded, screwed and/or riveted to the structural component. The second carrier element can be welded, screwed and/or riveted to the additional component. The connection between the structural component and the additional component is thus established indirectly via the first carrier element, the connection and decoupling elements and the second carrier element. However, the carrier elements are optional. The first connection and decoupling element can also be connected directly to the structural component. Accordingly, the second connection and decoupling element can also be connected directly to the additional component.

According to another embodiment, the first carrier element is oriented perpendicular to the structural component, wherein the second carrier element is oriented perpendicular to the additional component.

However, the orientation of the carrier elements is basically arbitrary. The first connection and decoupling element is preferably oriented parallel to the first carrier element and thus perpendicular to the structural component. The second connection and decoupling element is preferably oriented parallel to the second carrier element and thus perpendicular to the additional component. Furthermore, the first carrier element can also be oriented perpendicular to the additional component and the second carrier element can be oriented perpendicular to the structural component.

According to another embodiment, the first carrier element and the second carrier element are oriented parallel to one another, wherein the first connection and decoupling element and the second connection and decoupling element are arranged between the first carrier element and the second carrier element.

"Parallel to each other" in this case means that the first carrier element and the second carrier element can each span a plane that is arranged parallel to each other and at a distance from each other. The aforementioned planes can be arranged parallel to a plane of the coordinate system spanned by the x-direction and the y-direction. The first carrier element and/or the second carrier element can be plate-shaped or sheet-shaped.

A protected vehicle with such a vehicle cell is also proposed.

The protected vehicle may comprise several such assemblies. The protected vehicle may be a military vehicle, in particular a military utility vehicle. The protected vehicle may therefore also be referred to as a military vehicle or a military utility vehicle. The protected vehicle comprises the aforementioned vehicle cell. The vehicle cell may also be referred to as a passenger compartment, crew compartment or crew cell. The vehicle cell is protected against fire, booby traps, IEDs, mines or the like. The vehicle cell is armored. The vehicle cell encloses an interior, as mentioned above, in which crew members can stay. The interior may be divided into several sections or rooms, which may be separated from each other. For example, the interior may be divided into an engine compartment, a crew compartment and/or a driver's compartment. Partition walls or bulkheads can be provided for this purpose. These can act as additional components. The vehicle cell can also be at least partially or completely modular. In this case, the vehicle can comprise different mission modules that can be interchanged as required. A medical module can be cited as an example of such a mission module. The assembly can be part of such a mission module. The protected vehicle may be a wheeled vehicle. Alternatively, the protected vehicle may be a tracked vehicle. The protected vehicle may comprise a four-wheel drive.

According to one embodiment, the structural component is part of a vehicle cell of the protected vehicle.

In particular, the vehicle cell is made up of several such structural components, which are firmly connected to each other, for example welded, screwed and/or riveted together. The structural component can be a wall of the vehicle cell. For example, as previously mentioned, the vehicle cell comprises two side walls arranged parallel to each other and spaced apart from each other, which are structural components, a bottom, which is also a structural component, and a ceiling, which is also a structural component. However, the structural component is particularly preferably the bottom of the vehicle cell. Accordingly, the term "structural component" can also be exchanged for the term "bottom". In particular, the vehicle cell itself can also be a structural component to which the additional component is attached or to which several additional components are attached.

According to another embodiment, the additional component is arranged inside the vehicle cell.

Accordingly, the connection and decoupling apparatus is also preferably located within the vehicle cell. As previously mentioned, the vehicle cell encloses the interior. Accordingly, the additional component is arranged in the interior. However, as previously mentioned, the additional component can also be provided outside the vehicle cell. For example, the additional component can be attached to the outer side of the vehicle cell as armoring or the like. However, the additional component can also be a shelf structure as mentioned above, a bulkhead, a partition or the like.

The embodiments and features described for the proposed vehicle cell apply accordingly to the protected vehicle and vice versa.

In this case, "one" is not necessarily to be understood as being limited to exactly one element. Rather, several elements, such as two, three or more, can also be provided. Any other counting word used here is also not to be understood as meaning that there is a restriction to exactly the specified number of elements. Rather, numerical deviations upwards and downwards are possible, unless otherwise stated.

Further possible implementations of the vehicle cell and/or the protected vehicle also include combinations of features or embodiments described above or below with regard to the embodiment examples that are not explicitly mentioned. In this context, the person skilled in the art will also add individual aspects as improvements or additions to the respective basic form of the vehicle cell and/or the protected vehicle.

Further advantageous embodiments and aspects of the vehicle cell and/or the protected vehicle are the subject of the subclaims and of the embodiments of the vehicle cell and/or the protected vehicle described below. In the following, the vehicle cell and/or the protected vehicle are explained in more detail with reference to the attached figures.

DETAILED DESCRIPTION

In the figures, identical or functionally identical elements have been given the same reference symbols, unless otherwise stated.

Figure 1:
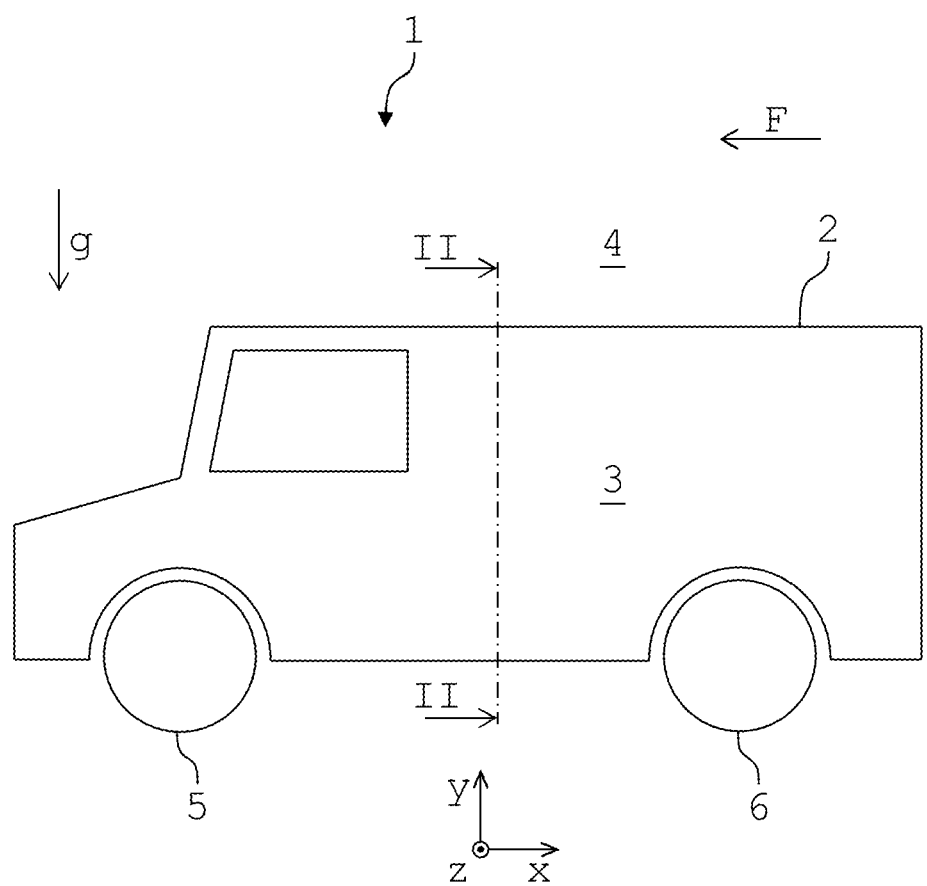
FIG. 1 shows a schematic side view of one embodiment of a protected vehicle.
Figure 2:
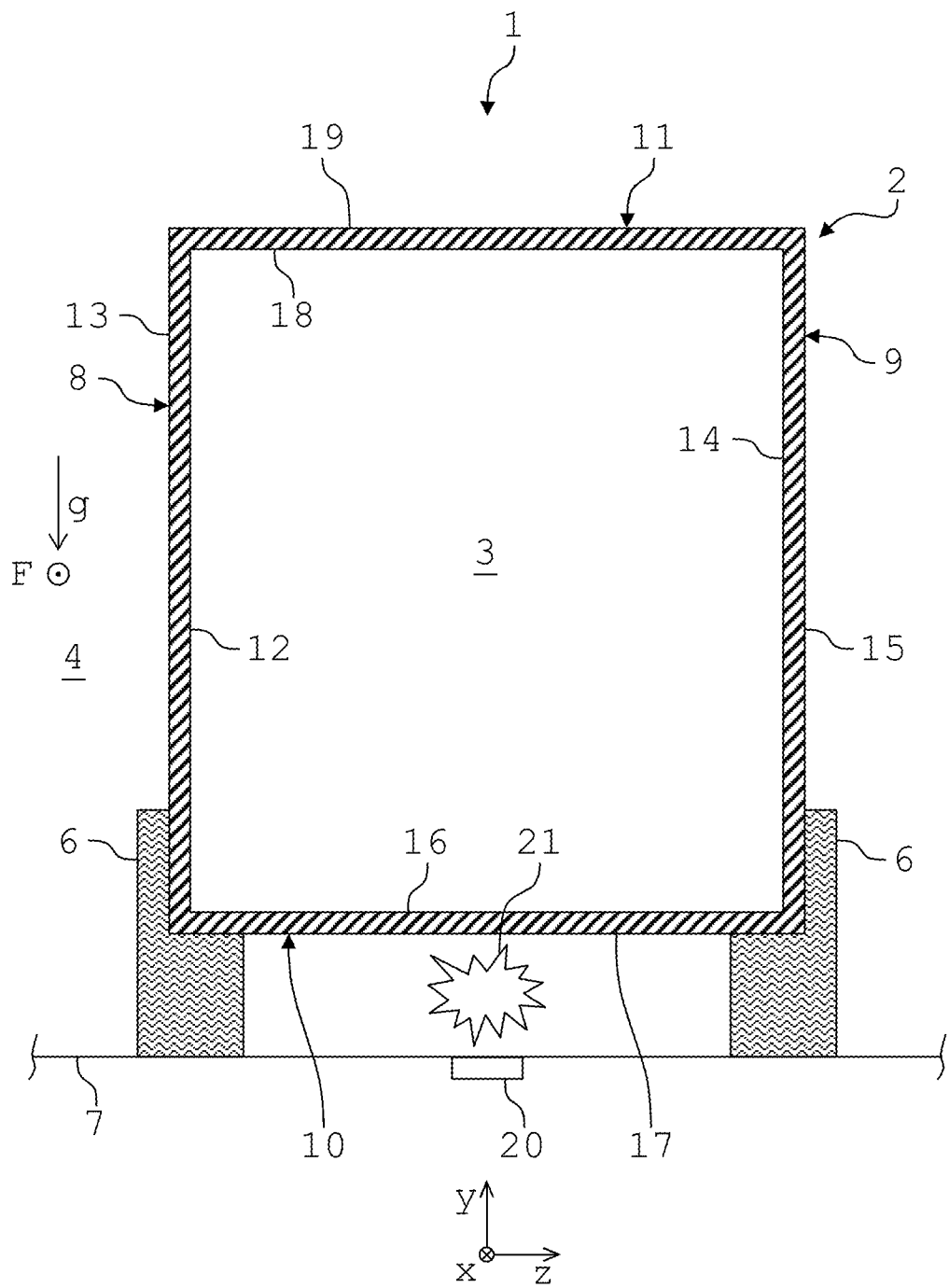
FIG. 2 shows a schematic sectional view of the protected vehicle according to sectional line II-II of FIG. 1.

FIG. 1 shows a schematic side view of one embodiment of a protected vehicle 1. FIG. 2 shows a schematic sectional view of the protected vehicle 1 along section line II-II of FIG. 1. Reference is made below to FIGS. 1 and 2 simultaneously.

The protected vehicle 1 is hereinafter referred to simply as the vehicle. The vehicle 1 may be a military vehicle, in particular a military utility vehicle. The vehicle 1 may therefore also be referred to as a military vehicle or a military utility vehicle. The vehicle 1 comprises a protected passenger compartment or vehicle cell 2. The vehicle cell 2 is protected against fire, booby traps, improvised explosive devices (IED), mines or the like. The vehicle cell 2 can be a vehicle hull and can therefore also be referred to as such. The terms "vehicle cell" and "vehicle hull" can therefore be used interchangeably.

The vehicle cell 2 is armored. The vehicle cell 2 encloses an interior 3 in which crew members can stay. The interior 3 is accessible from a surroundings 4 of the vehicle 1 via doors and/or hatches not shown. The interior 3 can be divided into several sections or rooms, which can be separated from one another. For example, the interior 3 may be divided into an engine compartment, a crew compartment and/or a driver's compartment. However, this is not absolutely necessary.

The vehicle cell 2 can also be at least partially or completely interchangeable on a modular basis. In this case, the vehicle 1 can comprise different mission modules, which can be interchanged as required. A medical module can be cited as an example of such a mission module. However, this modular structure described above is arbitrary.

The vehicle 1 can be a wheeled vehicle. Alternatively, the vehicle 1 can also be a tracked vehicle. The vehicle 1 comprises a plurality of wheel axles on which wheels 5, 6 are provided. For example, four wheels 5, 6, namely two front wheels and two rear wheels, are provided. The number of wheel axles is basically arbitrary. For example, two wheel axles or three wheel axles may be provided. Preferably, the vehicle 1 comprises all-wheel drive. This means that all wheel axles are driven.

A coordinate system comprising a width direction or x-direction x, a height direction or y-direction y and a depth direction or z-direction z is assigned to the vehicle 1. The directions x, y, z are oriented perpendicular to each other. A direction of gravity g can be oriented in the opposite direction to the y-direction y. The vehicle 1 can move along a driving direction F and against the driving direction F on a bottom or subsoil 7. The driving direction F can be oriented in the opposite direction to the x-direction x.

As shown in FIG. 2, the vehicle cell 2 comprises several structural components 8 to 11. The structural components 8 to 11 can also be referred to as structural parts. The terms "structural component" and "structural part" can therefore be used interchangeably. A first structural component 8, a second structural component 9, a third structural component 10 and a fourth structural component 11 may be provided. The structural components 8 to 11 are firmly connected to one another, for example welded, riveted and/or bolted together, and can together form (e.g., at least partially define) the vehicle cell 2. The structural components 8 to 11 may be walls of the vehicle cell 2. Therefore, the term "structural component" can be replaced by the term "wall". In the present case, a "structural component" is to be understood in particular as a load-bearing component or a load-bearing part of the vehicle 1.

For example, the structural components 8 to 11 are steel plates. However, the structural components 8 to 11 may also comprise composite materials. The aforementioned doors and/or hatches may be provided on the structural components 8 to 11 or on at least some of the structural components 8 to 11, by means of which the interior 3 is accessible from the surroundings 4.

The first structural component 8 can be a first side wall of the vehicle cell 2. Therefore, the terms "first structural component" and "first side wall" can be used interchangeably. The second structural component 9 can be a second side wall of the vehicle cell 2. Therefore, the terms "second structural component" and "second side wall" can be used interchangeably. Viewed along the z-direction z, the first structural component 8 and the second structural component 9 are arranged at a distance from one another. The first structural component 8 is arranged parallel to the second structural component 9.

The third structural component 10 can be a bottom of the vehicle cell 2. Therefore, the terms "third structural component" and "bottom" can be used interchangeably. The fourth structural component 11 may be a roof of the vehicle cell 2. Therefore, the terms "fourth structural component" and "roof" can be used interchangeably. Viewed along the y-direction y, the third structural component 10 and the fourth structural component 11 are arranged at a distance from one another. The third structural component 10 is arranged parallel to the fourth structural component 11. The structural components 8, 9 are oriented perpendicular to the structural components 10, 11. Furthermore, the vehicle cell 2 may also comprise a front wall not shown, and a rear wall not shown.

The third structural component 10, which, as previously mentioned, can form a bottom of the vehicle cell, can comprise a V-shaped geometry in cross-section, which is not shown. Furthermore, the third structural component 10 can also be designed as a double floor. In this case, two bottoms are provided, which are spaced apart along the y-direction y.

The first structural component 8 comprises an inner side 12 facing the interior 3 and an outer side 13 facing the surroundings 4. The second structural component 9 comprises an inner side 14 facing the interior 3 and an outer side 15 facing the surroundings 4. The third structural component 10 comprises an inner side 16 facing the interior 3 and an outer side 17 facing the surroundings 4. The fourth structural component 11 comprises an inner side 18 facing the interior 3 and an outer side 19 facing the surroundings 4. All inner sides 12, 14, 16, 18 face towards the interior 3 and away from the surroundings 4. All outer sides 13, 15, 17, 19 face towards the surroundings 4 and away from the interior 3.

When the vehicle 1 is in operation, it can be blasted using an explosive charge 20. The explosive charge 20 can be a mine, an IED or, for example, part of a recoilless rocket-propelled grenade (RPG). In the present example shown in FIG. 2, the explosive charge 20 can be concealed at least in sections in the subsoil 7. However, this is not absolutely necessary.

If the vehicle 1 drives over or past the explosive charge 20, the explosive charge 20 releases or ignites and generates a blast 21, which in the present case acts on the third structural component 10 and deforms it plastically and/or elastically in the direction of the interior 3. The blast 21 may also be referred to as a pressure wave. The blast 21 can also act on any other structural component 8, 9, 11. In this case, the explosive charge 20 may be placed to the side of the vehicle 1, for example. The explosive charge 20 can be triggered by contact or non-contact. In the latter case, for example, one of the wheels 5, 6 rolls over the explosive charge 20.

Protecting the vehicle 1 from a blast as mentioned above is crucial to protect crew members in the interior 3 from the effects of the blast 21. For this reason, the vehicle cell 2 is adapted so that it can absorb as much energy of the blast 21 as possible and not transmit it into the interior 3. This can be achieved, for example, by plastic deformation of the vehicle cell 2.

In the design of the vehicle 1 or vehicle cell 2, particular attention is paid to the implementation of additional components or additional components, such as bulkheads, partitions, shelf structures or the like, and their attachment to the structural components 8 to 11 of the vehicle cell 2.

For example, shelving structures for holding pieces of equipment or any components are inherently rigid structures. Due to their stiffness, such shelf structures react by buckling when large forces are introduced, which can cause pieces of equipment stored in the shelf structure to be accelerated. This can cause these pieces of equipment to be accelerated to such an extent that they act like projectiles within the interior 3. It must therefore be ensured that no energy and thus no accelerations are transmitted to the aforementioned additional components when the vehicle 1 is blasted.

According to in-house findings, such additional components, such as shelves, are suspended decoupled from a bottom of the vehicle cell 2, in this case the third structural component 10. For example, the additional components can be suspended from the fourth structural component 11. Additional components in the form of bulkheads or partitions can be curved. It is also possible to divide them and weld them overlapping so that the buckling or deformation takes place in a controllable range.

Decoupling these additional components from the structural components 8 to 11, as mentioned above, can supply the structural components 8 to 11 with a comparatively complex and heavy design. In addition, such solutions do not offer any conclusive certainty that the connection of the additional components to the structural components 8 to 11 will not result in energy being introduced into the additional components in the event of the vehicle 1 being blasted. Curved bulkheads or partition walls require more installation space, which can also complicate the design of adjacent components in the immediate vicinity. This needs to be improved.

Figure 3:
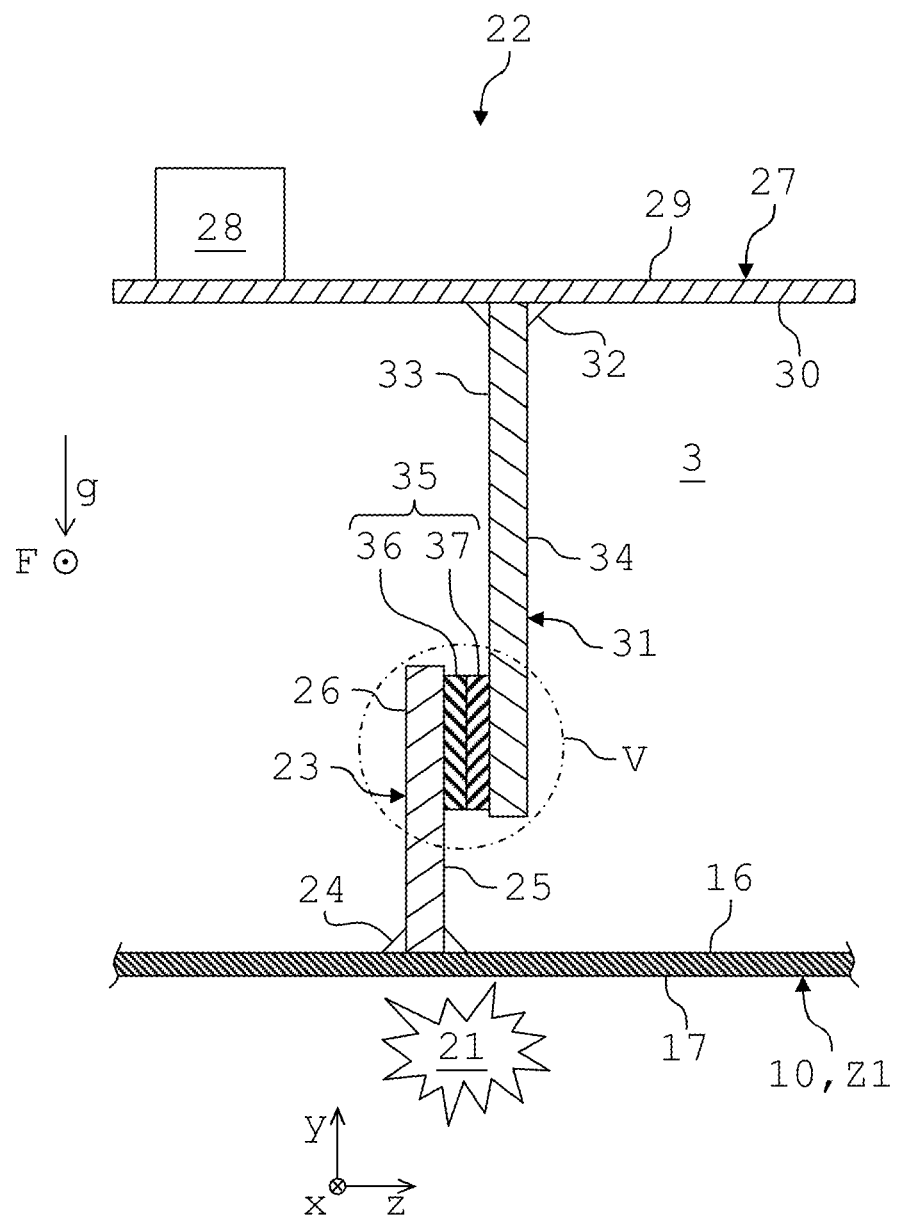
FIG. 3 shows a schematic sectional view of one embodiment of an assembly for the protected vehicle according to FIG. 1.
Figure 4:
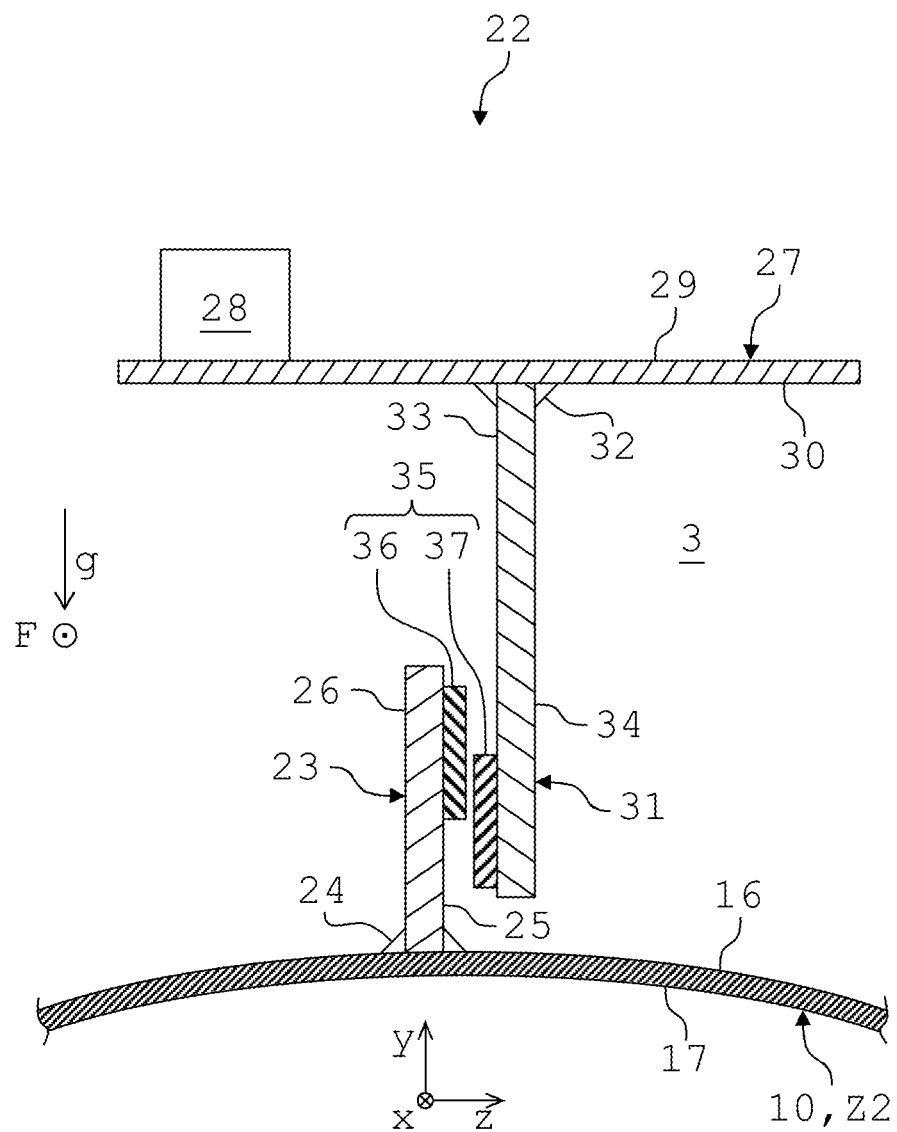
FIG. 4 shows another schematic sectional view of the assembly according to FIG. 3.
Figure 5:
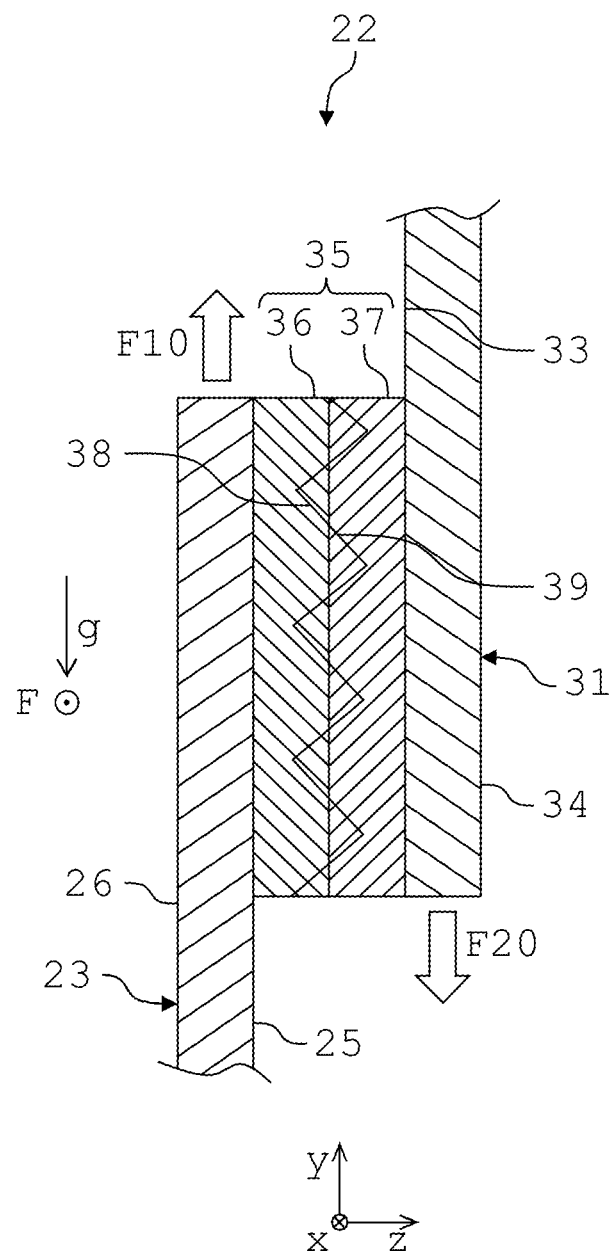
FIG. 5 shows the detailed view V according to FIG. 3.

FIG. 3 shows a schematic sectional view of an assembly 22 for the vehicle 1. FIG. 4 shows a further sectional view of the assembly 22. FIG. 5 shows the detailed view V according to FIG. 3. In the following, reference is made to FIGS. 3 to 5 simultaneously.

The assembly 22 is part of the vehicle cell 2. The assembly 22 can also be referred to as a protective assembly. Accordingly, the terms "assembly" and "protective assembly" can be used interchangeably. The assembly 22 comprises one of the structural components 8 to 11, in the present case the third structural component 10. However, the assembly 22 may also comprise the first structural component 8, the second structural component 9 and/or the fourth structural component 11. In the following, however, it is assumed that the assembly 22 comprises the third structural component 10, which is a bottom of the vehicle cell 2.

A first carrier element 23 may be attached to the third structural component 10. The first carrier element 23 can be a plate, in particular a steel plate, a sheet metal or the like. The first carrier element 23 can be firmly connected to the third structural component 10 by means of a welding seam 24. The first carrier element 23 is welded to the inner side 16 of the third structural component 10. The first carrier element 23 comprises a front side 25 and a rear side 26 facing away from the front side 25. The first carrier element 23 lies parallel to a plane spanned by the x-direction x and the y-direction y. The first carrier element 23 is oriented perpendicular to the third structural component 10.

The assembly 22 comprises an additional component 27 as mentioned above. The additional component 27 may also be referred to as an additional part. Accordingly, the terms "additional component" and "additional part" may be used interchangeably. The additional component 27 may be a bulkhead, a partition, a shelving structure or the like. Furthermore, the additional component 27 can also be removable armoring attached to an outer side of the vehicle cell 2. In the present case, the additional component 27 is a shelving structure suitable for holding pieces of equipment 28.

In the present case, the additional component 27 is plate-shaped and comprises an upper side 29 facing away from the inner side 16 of the third structural component 10 and a bottom side 30 facing the inner side 16. The piece of equipment 28 is placed on the upper side 29. The additional component 27 is arranged at a distance from the third structural component 10 and parallel thereto.

The additional component 27 comprises a second carrier element 31, which is plate shaped. The second carrier element 31 can be a steel plate or a sheet metal. The second carrier element 31 is firmly connected to the additional component 27, in particular to the bottom side 30 of the additional component 27, by means of a welding seam 32. The second carrier element 31 comprises a front side 33, which faces the front side 25 of the first carrier element 23, and a rear side 34 facing away from the front side 33. The second carrier element 31 lies parallel to a plane spanned by the x-direction x and the y-direction y. The carrier elements 23, 31 are thus placed parallel to each other. The second carrier element 31 is oriented perpendicular to the additional component 27.

The first carrier element 23 and the second carrier element 31 are connected to each other by means of a detachable connection and decoupling apparatus 35. Thus, the third structural component 10 and the additional component 27 are indirectly coupled or connected to each other with the aid of the carrier elements 23, 31 and the connection and decoupling apparatus 35.

The connection and decoupling apparatus 35 comprises a first connection and decoupling element 36, which is associated with the third structural component 10 or the first carrier element 23, and a second connection and decoupling element 37, which is associated with the additional component 27 or the second carrier element 31. The connection and decoupling elements 36, 37 can also be referred to as connection and separating elements.

The connection and decoupling apparatus 35 acts as a predetermined breaking point between the carrier elements 23, 31. The terms "connection and decoupling apparatus" and "predetermined breaking point" can therefore be used interchangeably. Furthermore, the connection and decoupling apparatus 35 can also be referred to as a connecting and separating apparatus. In one example, the connection and decoupling apparatus is configured to mechanically decouple the additional component from the structural component in the event of deformation of the structural component resulting from a blast acting on the structural component.

In the simplest case, the connection and decoupling apparatus 35 is an adhesive bond, whereby the connection and decoupling elements 36, 37 are part of this adhesive bond. In this case, the carrier elements 23, 31 are connected to each other by means of the connection and decoupling apparatus 35. In the case of materially bonded connections, the connecting partners are held together by atomic or molecular forces. Materially bonded connections are non-detachable connections that can only be separated by destroying the connecting means and/or the connecting partners.

To separate or decouple the carrier elements 23, 31, the connection and decoupling apparatus 35 can accordingly be destroyed, a first part of the connection and decoupling apparatus 35 remaining on the first carrier element 23 as a first connection and decoupling element 36 and a second part of the connection and decoupling apparatus 35 remaining on the second carrier element 31 as a second connection and decoupling element 37.

A positive connection can also be provided between the first connection and decoupling element 36 and the second connection and decoupling element 37. A positive connection is created by the interlocking or engagement of at least two connecting partners, in this case the two connection and decoupling elements 36, 37. In this case, the connection and decoupling apparatus 35 can be a hook and loop fastener or a hook and loop connection, as will be explained in detail below. The first connection and decoupling element 36 can engage with engagement sections 38 (FIG. 5) in corresponding counter engagement sections 39 of the second connection and decoupling element 37.

The connection between the first connection and decoupling element 36 and the second connection and decoupling element 37 can also be force-fit. A force-fit connection requires a normal force on the surfaces to be connected. Force-fit connections can be realized by frictional connection. Mutual displacement of the surfaces is prevented as long as a counterforce caused by static friction is not exceeded. A force-fit connection can also be realized as a magnetic force-fit connection. In this case, one of the connection and decoupling elements 36, 37 may comprise magnetic properties. For example, one of the connection and decoupling elements 36, 37 may be a permanent magnet. Both connection and decoupling elements 36, 37 can also be magnetic.

Figure 6:
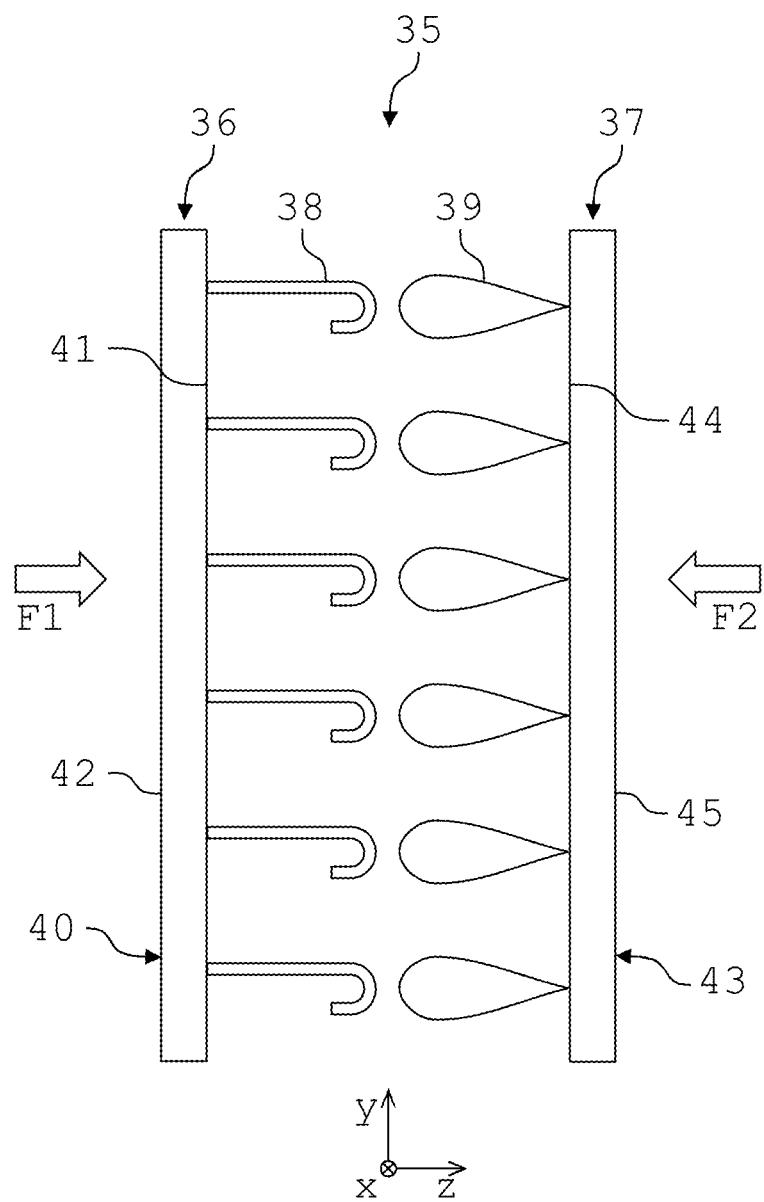
FIG. 6 shows a schematic view of one embodiment of a connection and decoupling apparatus for the assembly according to FIG. 3.

FIG. 6 shows a schematic view of an embodiment of a connection and decoupling apparatus 35 as mentioned above.

In this embodiment of the connection and decoupling apparatus 35, it is designed as a hook and loop fastener or hook and loop connection. The first connection and decoupling element 36 comprises a strip-shaped or plate-shaped basic section 40, which is firmly connected to the first carrier element 23. For example, the basic section 40 comprises an adhesive layer, so that the basic section 40 can be adhesively bonded to the first carrier element 23. However, the basic section 40 can also be riveted or screwed to the first carrier element 23.

The first connection and decoupling element 36 may be made of a plastic material. However, the first connection and decoupling element 36 may also be made of a metallic material. Composite materials can also be used for the first connection and decoupling element 36.

Extending from the basic section 40 is a plurality of engagement sections 38 as previously mentioned. The engagement sections 38 are barbed or hook shaped. The engagement sections 38 may therefore also be referred to as hook sections. Thus, the terms "engagement section" and "hook section" can be used interchangeably. However, the geometry of the engagement sections 38 is basically arbitrary. The engagement sections 38 are preferably evenly distributed on the basic section 40. The basic section 40 comprises a front side 41, from which the engagement sections 38 extend, and a rear side 42 facing away from the front side 41, which is connected, for example adhesively bonded, to the first carrier element 23.

The second connection and decoupling element 37 also comprises a strip-shaped or plate-shaped basic section 43, which is, however, firmly connected to the second carrier element 31. For example, the basic section 43 comprises an adhesive layer, so that the basic section 43 can be adhesively bonded to the second carrier element 31. However, the basic section 43 can also be riveted or screwed to the second carrier element 31.

The second connection and decoupling element 37 can be made of a plastic material. However, the second connection and decoupling element 37 can also be made of a metallic material. Composite materials can also be used for the second connection and decoupling element 37.

A plurality of counter engagement sections 39, as previously mentioned, extend out from the basic section 43. The counter engagement sections 39 are loop shaped. The counter engagement sections 39 may therefore also be referred to as loop sections. Thus, the terms "counter engagement section" and "loop section" can be used interchangeably. However, the geometry of the counter engagement sections 39 is basically arbitrary.

The counter engagement sections 39 are preferably evenly distributed on the basic section 43. The basic section 43 comprises a front side 44, from which the counter engagement sections 39 extend, and a rear side 45 facing away from the front side 44, which is connected, for example adhesively bonded, to the second carrier element 31.

To connect the connection and decoupling elements 36, 37 to each other, they are pressed together with a respective mounting force F1, F2 so that the engagement sections 38 engage positively with the counter engagement sections 39. The connection and decoupling elements 36, 37 are then positively connected to each other. The positive connection can preferably be released and re-established as often as required. The mounting forces F1, F2 are oriented along and against the z-direction z. In particular, the mounting forces F1, F2 are oriented perpendicular to the basic sections 40, 43.

The functionality of the connection and decoupling apparatus 35 is explained below with reference to FIGS. 3 to 6. When the vehicle 1 is blasted (e.g., receipt of a blast force exterior to the vehicle cell) as previously mentioned, the third structural component 10 is transferred by the blast 21 of the explosive charge 20 from an unwarped or undeformed state Z1 shown in FIG. 3 to a warped or deformed state Z2 shown in FIG. 4. This ballistic deformation of the third structural component 10 can be elastic and/or plastic. This means that the deformation can be at least partially reversible and at least partially irreversible. However, the deformation of the third structural component 10 can also be purely plastic.

When the third structural component 10 is transferred from the undeformed state Z1 to the deformed state Z2, the third structural component 10 deforms into the interior 3, causing the first carrier element 23 to move upwards as viewed along the y direction y. Since the additional component 27 does not initially move due to its mass inertia, two oppositely oriented shearing forces F10, F20 act on the connection and decoupling apparatus 35. A first shearing force F10 acting on the first connection and decoupling element 36 is oriented along the y-direction y and a second shearing force F20 acting on the second connection and decoupling element 37 is oriented in the opposite direction to the y-direction y. In one example, the oppositely and parallel oriented shearing forces act on the first connection and decoupling element and on the second connection and decoupling element in order to release the positive connection between the first connection and decoupling element and the second connection and decoupling element. In one example, the positive connection is automatically released.

Due to this relative movement of the carrier elements 23, 31 to each other, no buckling loads are applied to the carrier elements 23, 31, which prevents damage to them. In normal operation, i.e., as long as no blasting is carried out and no large deformations of the respective structural component 8 to 11 are to be expected, this type of connection also results in vibration decoupling of the additional component 27 from the respective structural component 8 to 11.

This decoupling allows small relative movements between the two carrier elements 23, 31, which do not supply to the separation of the connection. In this case, the connection and decoupling apparatus 35 acts as a damper or damping element, which makes the need for further decoupled suspensions of the additional component 27 obsolete.

The shearing forces F10, F20 cause the connection and decoupling elements 36, 37 to be separated (e.g., thereby disconnecting) from each other, so that the additional component 27 does not follow the movement of the third structural component 10 into the interior 3. Accordingly, the piece of equipment 28 is also not accelerated in an undesirable manner, as a result of which it cannot act as a projectile on a crew member located in the interior 3. (e.g., thereby reducing acceleration and movement of the additional component 27 relative to the third structural component 10). Injuries to the crew can therefore be reliably prevented.

In the event that the connection and decoupling apparatus 35 is a hook and loop connection or hook and loop fastener, as shown in FIG. 6, the engagement sections 38 and the counter engagement sections 39 are disengaged during the explosion. However, the connection and decoupling elements 36, 37 can be reconnected to each other after the explosion.

The shearing forces F10, F20 are achieved by the relative movement between the carrier elements 23, 31. If these shearing forces F10, F20 are sufficiently large, the connection between the connection and decoupling elements 36, 37 is severed by shearing. In the event that the connection and decoupling apparatus 35 is a hook and loop connection, a respective triggering shearing force F10, F20 of the connection and decoupling apparatus 35 can be set as desired by selecting a suitable hook and loop connection.

In this case, "destruction" of the connection between the connection and decoupling elements 36, 37 is limited to the hook and loop connection designed as connection and decoupling apparatus 35, which makes it possible to re-establish a new connection with the existing carrier elements 23, 31, provided that the carrier elements 23, 31 are not too badly damaged. In particular, the second carrier element 31 is a component to be protected, which only has to absorb the necessary second shearing force F20 by separating the connection. The second shearing force F20 should be small enough to prevent damage to the second carrier element 31 and thus to the additional component 27.

With the assembly 22, it is thus possible to mount any additional components 27, such as partitions, brackets, shelves or the like, decoupled from surfaces endangered by the blast 21 in a space-efficient and weight-efficient manner, in particular to suspend them. A predetermined breaking point in the form of the connection and decoupling apparatus 35 makes it possible to separate the additional component 27 from the respective structural component 8 to 11, which prevents the introduction of energy into the additional component 27 in the event of the penetrating blast 21.

The connection and decoupling apparatus 35 is attached in safety-critical areas and thus prevents the energy of the blast 21 from being introduced into the additional component 27 and structures connected thereto. The two independent connection and decoupling elements 36, 37 of the connection and decoupling apparatus 35 are preferably physically connected to each other in the manner of a hook and loop strap or hook and loop fastener.

In the event that the connection and decoupling apparatus 35 is a hook and loop strap or a hook and loop fastener, the connection and decoupling apparatus 35 can be selected to meet the respective requirements and thus also assume vibration-damping properties. In the event of ballistic deformation of the respective structural component 8 to 11, any bulging of the respective structural component 8 to 11 resulting from the deformation separates the connection and decoupling apparatus 35 by means of the shearing forces F10, F20, as a result of which the bulging of the structural component 8 to 11 is not passed on to the decoupled additional component 27.

With the aid of the assembly 22, it is thus possible for any additional components 27 to be suspended in safety-critical areas without creating a hazard for crew members present in the vehicle cell 2. Large and heavy constructions for the suspension of such additional components 27 in non-critical areas of the vehicle cell 2, such as the roof in the form of the fourth structural component 11, can advantageously be avoided, whereby both weight and installation space can be saved. However, it cannot be ruled out that an additional component 27 with such a connection and decoupling apparatus 35 is also connected to the fourth structural component 11.

In addition, it is possible to achieve vibration damping between the respective structural component 8 to 11 and the additional component 27 with an appropriate design of the connection and decoupling apparatus 35, for example in the form of a hook and loop connection, making additional decoupling obsolete. A further advantage is that the connection between the respective structural component 8 to 11 and the additional component 27 can be created very cost-effectively and without additional components. In the event that the connection and decoupling apparatus 35 is a hook and loop fastener, this is glued to the planar front sides 25, 33 of the carrier elements 23, 31 to be connected. This means that no complex welding preparation is required, and the tolerances can be somewhat coarser than with comparable welded structures.

In the event that the connection and decoupling apparatus 35 is an adhesive bond or an adhesive point, the function of the predetermined breaking point can be achieved by a suitable selection of the adhesive and a suitable adhesive thickness. For example, an elastic adhesive bond can be realized, such as with the aid of silicone or sealing tapes. Depending on the selection of this adhesive bond, a separation of the additional component 27 from the respective structural component 8 to 11 can also be generated by the applied shearing forces F10, F20.

Although the present invention has been described with reference to examples of embodiments, it can be modified in many ways.

LIST OF REFERENCE SIGNS

1 Vehicle
2 Vehicle cell
3 Interior
4 Surroundings
5 Wheel
6 Wheel
7 Subsoil
8 Structural component/side wall
9 Structural component/side wall
10 Structural component/bottom
11 Structural component/roof
12 Inner side
13 Outer side
14 Inner side
15 Outer side
16 Inner side
17 Outer side
18 Inner side
19 Outer side
20 Explosive charge
21 Blast
22 Assembly
23 Carrier element
24 Welding seam
25 Front side
26 Rear side
27 Additional component
28 Piece of equipment
29 Upper side
30 Bottom side
31 Carrier element
32 Welding seam
33 Front side
34 Rear side
35 Connection and decoupling apparatus
36 Connection and decoupling element
37 Connection and decoupling element
38 Engagement section
39 Counter engagement section
40 Basic section
41 Front side
42 Rear side
43 Basic section
44 Front side
45 Rear side
F Driving direction
F1 Mounting force
F2 Mounting force
F10 Shearing force
F20 Shearing force
g Direction of gravity
x x-direction
y y-direction
z z-direction
Z1 State
Z2 State

The invention claimed is:

1. A vehicle cell for a protected vehicle, comprising:
an assembly, comprising:
a structural component;
an additional component arranged within the vehicle cell; and
a connection and decoupling apparatus, configured to connect the additional component to the structural component,
wherein the connection and decoupling apparatus is further configured to mechanically decouple the additional component from the structural component in an event of a deformation of the structural component resulting from a blast acting on the structural component,
wherein the connection and decoupling apparatus (35) further comprises a hook and loop fastener,
wherein the additional component is positively connected to the structural component by the connection and decoupling apparatus,
wherein the connection and decoupling apparatus further comprises a first connection and decoupling element assigned to the structural component and a second connection and decoupling element assigned to the additional component,
wherein the first connection and decoupling element and the second connection and decoupling element engage positively with one another to connect the additional component to the structural component,
wherein the first connection and decoupling element is oriented perpendicularly to the structural component, and
wherein the second connection and decoupling element is oriented perpendicularly to the additional component.

2. The vehicle cell according to claim 1, wherein the positive connection between the first connection and decoupling element and the second connection and decoupling element is automatically released as a result of the deformation of the structural component in order to mechanically decouple the additional component from the structural component.

3. The vehicle cell according to claim 2, wherein when the structural component is deformed, oppositely and parallel oriented shearing forces act on the first connection and decoupling element and on the second connection and decoupling element in order to automatically release the positive connection between the first connection and decoupling element and the second connection and decoupling element.

4. The vehicle cell according to claim 1, wherein the first connection and decoupling element further comprises engagement sections, wherein the second connection and decoupling element further comprises counter engagement sections corresponding to the engagement sections, and wherein the engagement sections are configured to engage positively in the counter engagement sections.

5. The vehicle cell according to claim 4, wherein at least one of the engagement sections or the counter engagement sections are elastically deformable.

6. The vehicle cell according to claim 4, wherein the engagement sections are hook-shaped and the counter engagement sections are loop-shaped.

7. The vehicle cell according to claim 1, wherein the assembly further comprises:
a first carrier element, which is connected to the structural component and carries the first connection and decoupling element; and
a second carrier element, which is connected to the additional component and carries the second connection and decoupling element.

8. The vehicle cell according to claim 7, wherein the first carrier element is oriented perpendicularly to the structural component, and wherein the second carrier element is oriented perpendicularly to the additional component.

9. The vehicle cell according to claim 8, wherein the first carrier element and the second carrier element are oriented parallel to one another, wherein the first connection and decoupling element and the second connection and decoupling element are positioned between the first carrier element and the second carrier element.

10. A protected vehicle comprising a vehicle cell according to claim 1.

11. The vehicle cell according to claim 3, wherein the first connection and decoupling element further comprises engagement sections, wherein the second connection and decoupling element further comprises counter engagement sections corresponding to the engagement sections, and wherein the engagement sections are configured to engage positively in the counter engagement sections.

12. The vehicle cell according to claim 4, wherein the engagement sections are loop-shaped and the counter engagement sections are hook-shaped.

13. The vehicle cell according to claim 5, wherein the engagement sections are hook-shaped and the counter engagement sections are loop-shaped.

14. The vehicle cell according to claim 6, wherein the assembly further comprises:
a first carrier element, which is connected to the structural component and carries the first connection and decoupling element; and
a second carrier element, which is connected to the additional component and carries the second connection and decoupling element.

15. A vehicle cell for use with a protected vehicle, comprising:
a structural component at least partially defining an interior of the vehicle cell;
an additional component positioned in the interior of the vehicle cell;
a first carrier element connected to the structural component;
a second carrier element connected to the additional component;
a connection and decoupling apparatus configured to connect the additional component to the structural component, the connection and decoupling apparatus comprising:
a first connection and decoupling element connected to the first carrier element; and
a second connection and decoupling element connected to the second carrier element, the first connection and decoupling element and the second connection and decoupling element configured to at least one of materially bond, positively connect, or force-fit connect together,
wherein on deformation of the structural component from receipt of a blast force exterior to the vehicle cell, the first connection and decoupling element and the second connection and decoupling element automatically mechanically decouple thereby disconnecting the additional component from the structural component thereby reducing acceleration and movement of the additional component relative to the structural component as a result of the blast force.

16. The vehicle cell of claim 15, wherein the first connection and decoupling element and the second connection and decoupling element positively connect together, wherein the first connection and decoupling element comprises a hook configured fastener and the second connection and decoupling element comprises a loop configured fastener or the first connection and decoupling element comprises a loop configured fastener and the second connection and decoupling element comprises a hook configured fastener.

17. The vehicle cell of claim 15, wherein first connection and decoupling element and the second connection and decoupling element force-fit connect together, and wherein at least one of the first connection and decoupling element or the second connection and decoupling element comprise a permanent magnet.

* * * * *